United States Patent
Lee et al.

(10) Patent No.: US 7,953,412 B2
(45) Date of Patent: May 31, 2011

(54) SYSTEM AND METHOD FOR PERFORMING HANDOVER IN A WIRELESS MOBILE COMMUNICATION SYSTEM

(75) Inventors: Ok-Seon Lee, Suwon-si (KR);
Chi-Hyun Park, Suwon-si (KR);
Sang-Boh Yun, Seongnami-si (KR);
Jong-Hyung Kwun, Soeul (KR);
Sung-Hyun Cho, Suwon-si (KR);
Jung-Hoon Cheon, Suwon-si (JP)

(73) Assignee: Samsung Electronics Co., Ltd (KR)

( * ) Notice: Subject to any disclaimer, the term of this patent is extended or adjusted under 35 U.S.C. 154(b) by 1291 days.

(21) Appl. No.: 11/510,002

(22) Filed: Aug. 25, 2006

(65) Prior Publication Data
US 2007/0054667 A1 Mar. 8, 2007

(30) Foreign Application Priority Data
Aug. 25, 2005 (KR) .................. 10-2005-0078354

(51) Int. Cl.
*H04Q 7/20* (2006.01)
(52) U.S. Cl. ........................................ 455/436
(58) Field of Classification Search .............. 455/67.13
See application file for complete search history.

(56) References Cited

U.S. PATENT DOCUMENTS

| | | | |
|---|---|---|---|
| 5,682,601 A * | 10/1997 | Sasuta ........................... | 455/437 |
| 5,881,369 A * | 3/1999 | Dean et al. ........................ | 455/78 |
| 5,970,058 A | 10/1999 | DeClerk et al. | |
| 6,192,246 B1 * | 2/2001 | Satarasinghe ................ | 455/442 |
| 6,229,996 B1 * | 5/2001 | Uistola ...................... | 455/168.1 |
| 6,611,507 B1 | 8/2003 | Hottinen et al. | |
| 2004/0246891 A1 * | 12/2004 | Kay et al. ....................... | 370/215 |
| 2005/0059437 A1 | 3/2005 | Son et al. | |
| 2006/0025149 A1 * | 2/2006 | Karaoguz et al. .......... | 455/452.2 |
| 2006/0073827 A1 * | 4/2006 | Vaisanen et al. .............. | 455/436 |

FOREIGN PATENT DOCUMENTS

| | | |
|---|---|---|
| KR | 1020010006287 | 1/2001 |
| KR | 1020020035114 | 5/2002 |
| KR | 1020050060483 | 6/2005 |
| WO | WO 01/10159 | 2/2001 |
| WO | WO 2004/057899 | 7/2004 |
| WO | WO 2005/046273 | 5/2005 |

* cited by examiner

*Primary Examiner* — Dwayne D Bost
*Assistant Examiner* — Joseph Dean, Jr.
(74) *Attorney, Agent, or Firm* — The Farrell Law Firm, P.C.

(57) ABSTRACT

A system and method for performing handover in a wireless mobile communication system are provided. In a Mobile Station (MS)-initiated scanning method of an (MS) in a wireless mobile communication system having at least two frequency bands with different central frequencies, the MS receives from a serving Base Station (BS) a mobile neighbor advertisement message including information about available radio resources of the neighbor BSs, transmits a new scanning request message to the serving BS, if the MS determines to measure Carrier-to-Interference and Noise Ratios (CINRs) of pilot signals from the serving BS and the neighbor BS, receives from the serving BS a response message for the scanning request message, including information about a BS which has reserved radio resources for a predetermined one of the at least two frequency bands, and measures the CINRs of the pilot signals in the predetermined frequency band.

34 Claims, 7 Drawing Sheets

SYSTEM AND METHOD FOR PERFORMING HANDOVER IN A WIRELESS MOBILE COMMUNICATION SYSTEM

PRIORITY

This application claims priority under 35 U.S.C. §119 to an application entitled "System And Method For Performing Handover In A Wireless Mobile Communication System" filed in the Korean Intellectual Property Office on Aug. 25, 2005 and assigned Ser. No. 2005-78354, the contents of which are incorporated herein by reference.

BACKGROUND OF THE INVENTION

1. Field of the Invention

The present invention relates generally to a wireless mobile communication system, and in particular, to a system and method for performing a handover for a Mobile Station (MS).

2. Description of the Related Art

Provisioning of services with a variety of Quality of Service (QoS) levels at about 100 Mbps to users will be necessary in a future-generation communication system called a $4^{th}$ Generation (4G) mobile communication system. The 4G communication system is envisioned as a new communication system that supports user mobility and QoS to Wireless Local Area Network (WLAN) providing relatively high data rates and a Wireless Metropolitan Area Network (WMAN). A major 4G communication system is known as the Institute of Electrical and Electronics Engineers (IEEE) 802.16 communication system.

With reference to FIG. 1, the configuration of a multi-cell IEEE 802.16e communication system will be described as one of the IEEE 802.16 communication systems.

FIG. 1 illustrates the configuration of the typical IEEE 802.16e communication system.

Referring to FIG. 1, the IEEE 802.16e communication system has a plurality of cells 100 and 150, Base Stations (BSs) 110 and 140 having the cells 100 and 150 under their control, respectively, and a plurality of MSs 111, 113, 130, 151, and 153.

The MS 130 is located at the boundary between the cells 100 and 150, i.e., in a handover region. Thus, support of handover for the MS 130 is equivalent to support of mobility for the MS 130.

Since the IEEE 802.16e communication system supports mobility to an MS, it can move from a current BS (i.e. a serving BS) to a neighbor BS.

The process from selection of the serving BS by the MS until before handover will be described below.

Upon power-on, the MS monitors a total frequency band and detects a pilot channel signal having the highest pilot Carrier-to-Interference and Noise Ratio (CINR). The MS determines that the BS which sent the pilot channel signal is its serving BS. Then the MS receives pilot signals from the serving BS and neighbor BSs and measures the CINRs of the pilot signals. If the CINR of a neighbor BS is higher than that of the serving BS, the MS operates for a handover to the neighbor BS. This step of measuring the channel status of the serving BS and the neighbor BSs is called scanning. With reference to FIG. 2, an MS-initiated scanning in the typical IEEE 802.16e communication system will be described.

FIG. 2 is a diagram illustrating a signal flow for the MS-initiated scanning in the typical IEEE 802.16e communication system.

A scanning request can be initiated by a BS or an MS. In the former case, the BS may request the MS to scan neighbor BSs in order to distribute its load, while in the latter case, the MS may request scanning to the BS when the CINR of a current channel is lower than a predetermined threshold.

Referring to FIG. 2, a first BS 220 (BS #1) is a serving BS which periodically sends a Mobile_Neighbor-Advertisement (MOB_NBR-ADV) message to an MS 200 in step 202. BS #1 broadcasts information about a second BS 240 (BS #2) and a third BS 260 (BS #3) by the MOB_NBR-ADV message. The MOB_NBR-ADV message is formatted as defined in the IEEE 802.16e/Document 8, the contents of which are incorporated herein by reference.

When the MS 200 desires to scan the neighbor BSs after receiving the MOB_NBR-ADV message, it sends a Mobile_Scanning Interval Allocation-Request (MOB_SCN-REQ) message to BS #1 in step 204. The MOB_SCN-REQ has a configuration as defined in the IEEE 802.16e/Document 8.

Upon receipt of the MOB_SCN-REQ message, BS #1 replies with a Mobile_Scanning Interval Allocation-Response (MOB_SCAN-RSP) message containing scanning information (such as scan iteration information, etc.) to the MS 200 in step 206. The configuration of the MOB_SCN-RSP is also defined in the IEEE 802.16e/Document 8.

The MS 200 scans the pilot CINRs of the neighbor BSs for N frames M frames after receiving the MOB_SCN-RSP message in steps 208 and 210. The parameters M and N are assumed, for convenience sake. How many times the MS 200 is to scan is determined by scan iteration information included in the scanning information.

The MS 200 reports pilot CINR measurements acquired during the scanning to BS #1 by a Mobile_Scanning-Report (MOB_SCN-REP) message in step 211. In step 212, the MS receives data traffic from BS #1 during a frame period indicated by interleaving interval information.

In step 214 through step 218, the MS 200 repeats the pilot CINR measurement and the data traffic reception a predetermined number of times, i.e., as many times as indicated by the scan iteration information.

As described above, to support handover in the IEEE 802.16e system, the MS 200 measures the pilot CINRS of the serving BS 220 and the neighbor BSs. If the pilot CINR of the serving BS 220 is lower than that of a neighbor BS 240 or 260, the MS 200 request a handover (to one of the target BSs 240 or 260) to the serving BS 220.

Owing to the development of communication technology, MSs demand large-capacity and diverse services. In this context, BSs must satisfy the demand by operating in both a Narrow frequency Band (NB) and a Wide frequency Band (WB). Also, the BSs may use various frequency modes, for example, a combination of Frequency Division Duplex (FDD) and Time Division Duplex (TDD). When a BS uses at least two different frequency bands and/or at least two different frequency modes (i.e., operates in a dual mode), an MS communicating with the corresponding BS must operate the frequency bands and/or frequency modes in a similar fashion.

Accordingly, MSs operating in a dual mode or other similar environment (e.g., the NB and/or WB environments) scan the NB and the WB individually, and/or scan in the individual frequency modes. This results in the increase of scanning time and hardware/software complexity. In addition, the MS cannot receive data traffic during the scanning period. Accordingly, there is a need for a technique for enabling fast, successful handover through efficient scanning of an MS in a communication system using different frequency bands and/or different frequency modes.

SUMMARY OF THE INVENTION

An object of the present invention is to substantially solve at least the above problems and/or disadvantages and to provide at least the advantages below. Accordingly, the present invention provides a system and method for enabling an MS to efficiently scan in a Broadband Wireless Access (BWA) communication system using different frequency bands and/or different frequency modes.

The present invention provides a system and method for enabling an MS to perform handover successfully in a BWA communication system using different frequency bands and different frequency modes.

According to one aspect of the present invention, in a method of performing an MS-initiated scanning in an MS in a wireless mobile communication system having at least two frequency bands with different central frequencies, the MS receives from a serving BS a mobile neighbor advertisement message including information about available radio resources of neighbor BS, transmits a new scanning request message to the serving BS, if the MS determines to measure the CINRs of pilot signals from the serving BS and the neighbor BS, receives from the serving BS a response message for the scanning request message, including information about a BS which has reserved radio resources for a predetermined one of the at least two frequency bands, and measures the CINRs of the pilot signals in the predetermined frequency band.

According to another aspect of the present invention, in a scanning method in a serving BS in a wireless mobile communication system having at least two frequency bands with different central frequencies, the serving BS transmits a mobile neighbor advertisement message including information about available radio resources of the neighbor BSs, and determines whether radio resources are available for a current frequency band of an MS in the serving BS and the neighbor BS, if determining that scanning is required for the MS. In the absence of the available radio resources, the serving BS requests the neighbor BS to reserve radio resources for the current frequency band of the MS, and receives a response message for the resource reservation request from the neighbor BS. If the response message indicates a successful resource reservation, the serving BS transmits a scanning response message including information about the neighbor BS to the MS.

According to a further aspect of the present invention, in a scanning method in a BS neighboring a serving BS in a wireless mobile communication system having at least two frequency bands with different central frequencies, the neighbor BS receives a resource reservation request for a first MS from the serving BS and determines whether available radio resources exist for a first frequency band in which the first MS operates currently. In the absence of the available radio resources, the neighbor BS searches for a second MS operating in the first frequency band of the first MS and capable of transitioning to a second frequency band among MSs managed by the neighbor BS. If the second MS is detected, the neighbor BS releases radio resources used in the first frequency band for the second BS by transitioning the second MS to the second frequency band, reserves the released radio resources for the first MS, and transmits information indicating the radio resource reservation to the serving BS.

According to still another aspect of the present invention, in a method of performing an MS-initiated scanning in an MS in a wireless mobile communication system having at least two different frequency modes, the MS receives from a serving BS a mobile neighbor advertisement message including information about available radio resources of the neighbor BSs, transmits a new scanning request message to the serving BS, if the MS determines to measure the CINRs of pilot signals from the serving BS and the neighbor BS, receives from the serving BS a response message for the scanning request message, including information about a BS which has reserved radio resources for a predetermined one of the at least two frequency modes, and measures the CINRs of the pilot signals in the predetermined frequency mode.

According to still further of the present invention, in a scanning method in a serving BS in a wireless mobile communication system having two different frequency modes, the serving BS transmits a mobile neighbor advertisement message including information about available radio resources of the neighbor BSs, and determines whether radio resources are available for a current frequency mode of an MS in the neighbor BSs, if determining that scanning is required for the MS. And the serving BS requests the neighbor BS to reserve radio resources for the current frequency mode of the MS, and receives a response message for the resource reservation request from the neighbor BS. If the response message indicates successful resource reservation, the serving BS transmits a scanning response message including information about the neighbor BS to the MS.

According to yet another aspect of the present invention, in a scanning method in a BS neighboring a serving BS in a wireless mobile communication system having at least two different frequency modes, the neighbor BS receives a radio resource reservation request for a first MS from the serving BS and determines whether available radio resources exist for a first frequency mode in which the first MS currently operates. In the absence of the available radio resources, the neighbor BS searches for a second MS operating in the first frequency mode of the first MS and capable of transitioning to a second frequency mode among MSs managed by the neighbor BS. If the second MS is detected, the neighbor BS releases radio resources used in the first frequency mode for the second BS by transitioning the second MS to the second frequency mode, reserves the released radio resources for the first MS, and transmits information indicating the radio resources reserved for the first MS to the serving BS.

According to yet further aspect of the present invention, in a wireless mobile communication system having at least two frequency bands each having different central frequencies, a scanning system includes an MS, a serving BS, and a neighbor BS. The MS receives from the serving BS a mobile neighbor advertisement including information about available radio resources of the neighbor BSs, determines whether to measure CINRs of pilot signals received from the serving BS and the neighbor BS, transmits a new scanning request message to the serving BS, if the MS determines to measure the CINRs of the pilot signals, receives a scanning response message for the scanning request message from the serving BS, the response message including information about a BS which has reserved radio resources for a predetermined one of the at least two frequency bands, and measures the CINRs of the pilot signals from the serving BS and the neighbor BS in the predetermined frequency band. The serving BS transmits the mobile neighbor advertisement message, determines whether radio resources are available for a first frequency band in which the MS currently operates in the serving BS and the neighbor BS, upon receipt of a scanning request from the MS or if determining that scanning is required for the MS, requests the neighbor BS to reserve radio resources for the first frequency band, in the absence of the available radio resources, receives a response message for the resource reservation request from the neighbor BS, and transmits the scanning response message to the MS, if the response message indicates successful resource reservation. The neighbor BS receives the resource reservation request from the serving BS, determines whether available radio resources exist for the first frequency band, searching for a second MS operating in the first frequency band of the first MS and capable of transitioning to a second frequency band among MSs managed by the neighbor BS, in the absence of the available radio resources, releases radio resources used in the first frequency band for the second BS by transitioning the second MS to the second frequency band, if the second MS is detected; reserves the released radio resources for the MS, and sends the response message indicating successful radio resource reservation to the serving BS.

According to yet further another aspect of the present invention, in a wireless mobile communication system having at least two different frequency modes, a scanning system includes an MS, a serving BS, and a neighbor BS. The MS receives from the serving BS a mobile neighbor advertisement including information about available radio resources of the neighbor BSs, determines whether to measure CINRs of pilot signals received from the serving BS and the neighbor BS, transmits a new scanning request message to the serving BS, if the MS determines to measure the CINRs of the pilot signals, receives a scanning response message for the scanning request message from the serving BS, the response message including information about a BS which has reserved radio resources for a predetermined one of the at least two frequency modes, and measures the CINRs of the pilot signals from the serving BS and the neighbor BS in the predetermined frequency mode. The serving BS transmits the mobile neighbor advertisement message, determines whether radio resources are available for a first frequency mode in which the MS currently operates in the serving BS and the neighbor BS, upon receipt of a scanning request from the MS or if determining that scanning is required for the MS, requests the neighbor BS to reserve radio resources for the first frequency mode, in the absence of the available radio resources, receives a response message for the resource reservation request from the neighbor BS, and transmits the scanning response message to the MS, if the response message indicates successful resource reservation. The neighbor BS receives the resource reservation request from the serving BS, determines whether available radio resources exist for the first frequency mode, searches for a second MS operating in the first frequency mode of the first MS and capable of transitioning to a second frequency mode among MSs managed by the neighbor BS, in the absence of the available radio resources, releases radio resources used in the first frequency mode for the second BS by transitioning the second MS to the second frequency mode, if the second MS is detected; reserves the released radio resources for the MS, and transmits the response message indicating successful radio resource reservation to the serving BS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a system and method for enabling an MS to efficiently scan in a BWA communication system using at least two different frequency bands and at least two different frequency modes. The MS performs a successful handover with a minimized handover time delay through the efficient scanning. Furthermore, radio resource utilization is maximized across the entire system.

In accordance with the present invention, the MS scans in a predetermined frequency band and/or a predetermined frequency mode rather than scanning in all frequency bands and/or all frequency modes. A BS secures radio resources for use in the MS beforehand so as to ensure the success of the handover and minimize the handover time delay for the MS. A WB and an NB are taken as the different frequency bands and FDD mode and TDD mode are taken as the different frequency modes, by way of example. Also, the present invention will be described in the context of a BWA communication system as one of wireless mobile communication systems.

Figure 1:
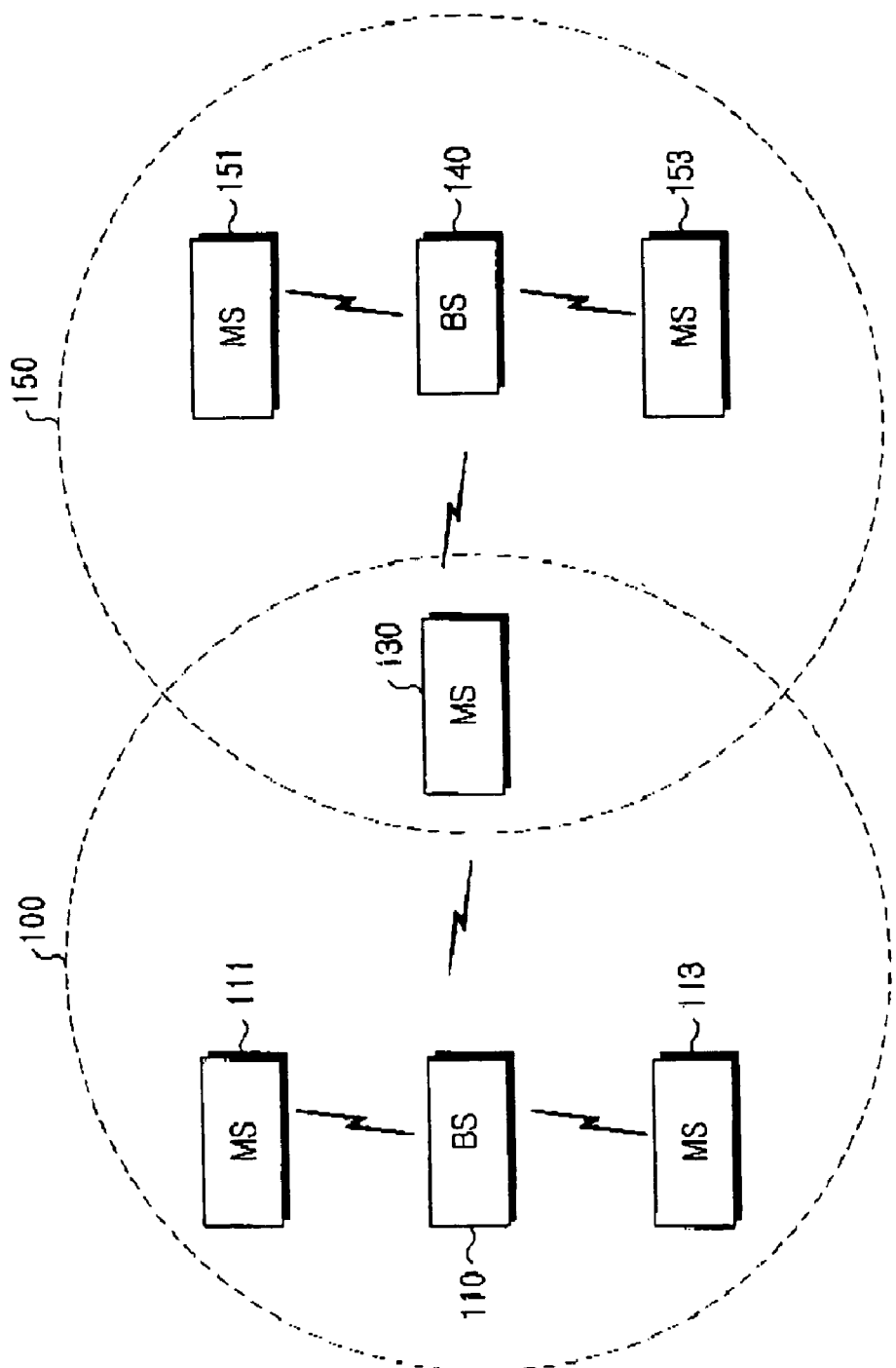
FIG. 1 is a block diagram configuration of a typical IEEE 802.16e communication system.
Figure 2:
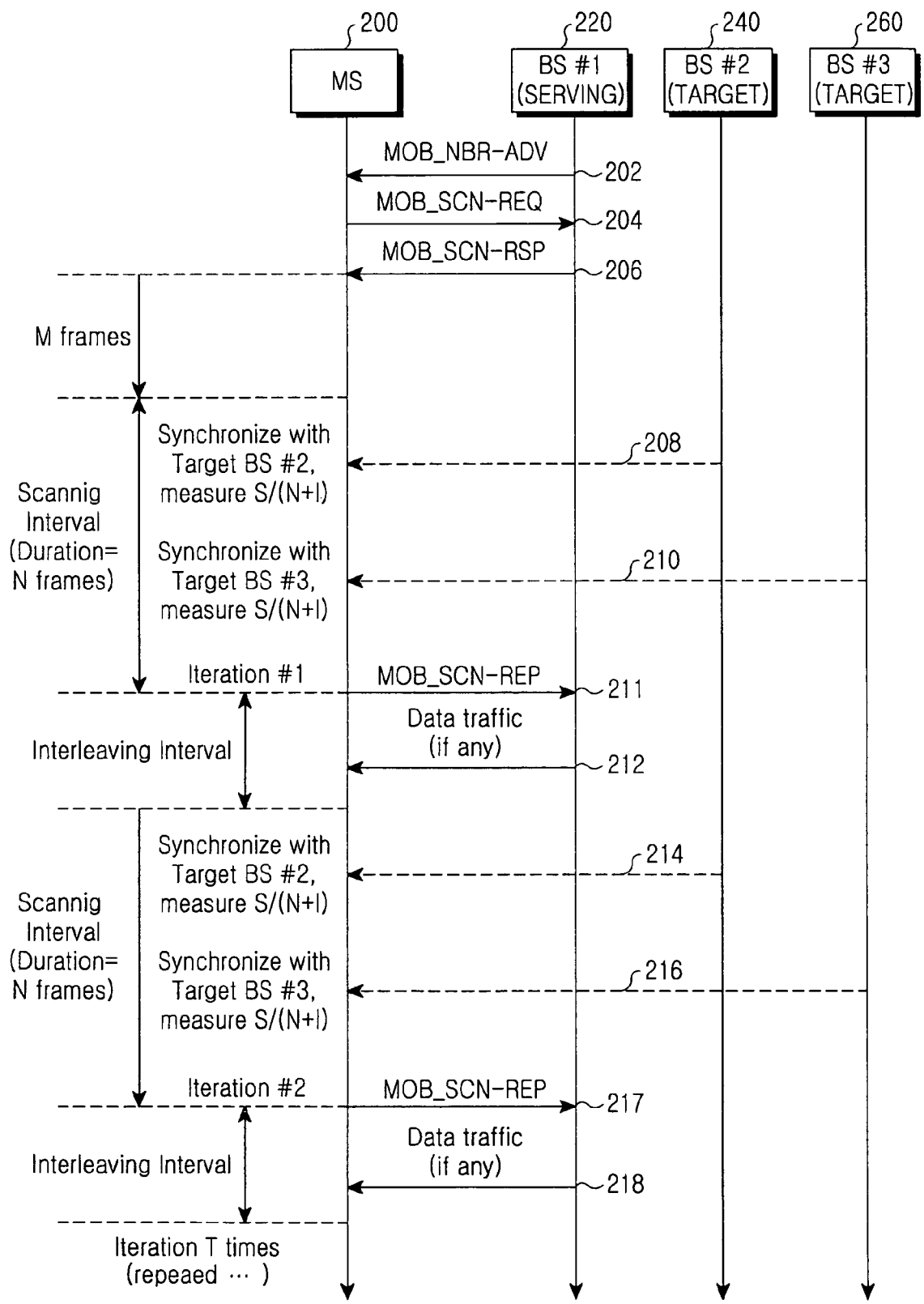
FIG. 2 is a flow diagram illustrating a signal flow for an MS-initiated scanning operation in the typical IEEE 802.16e communication system.
Figure 3:
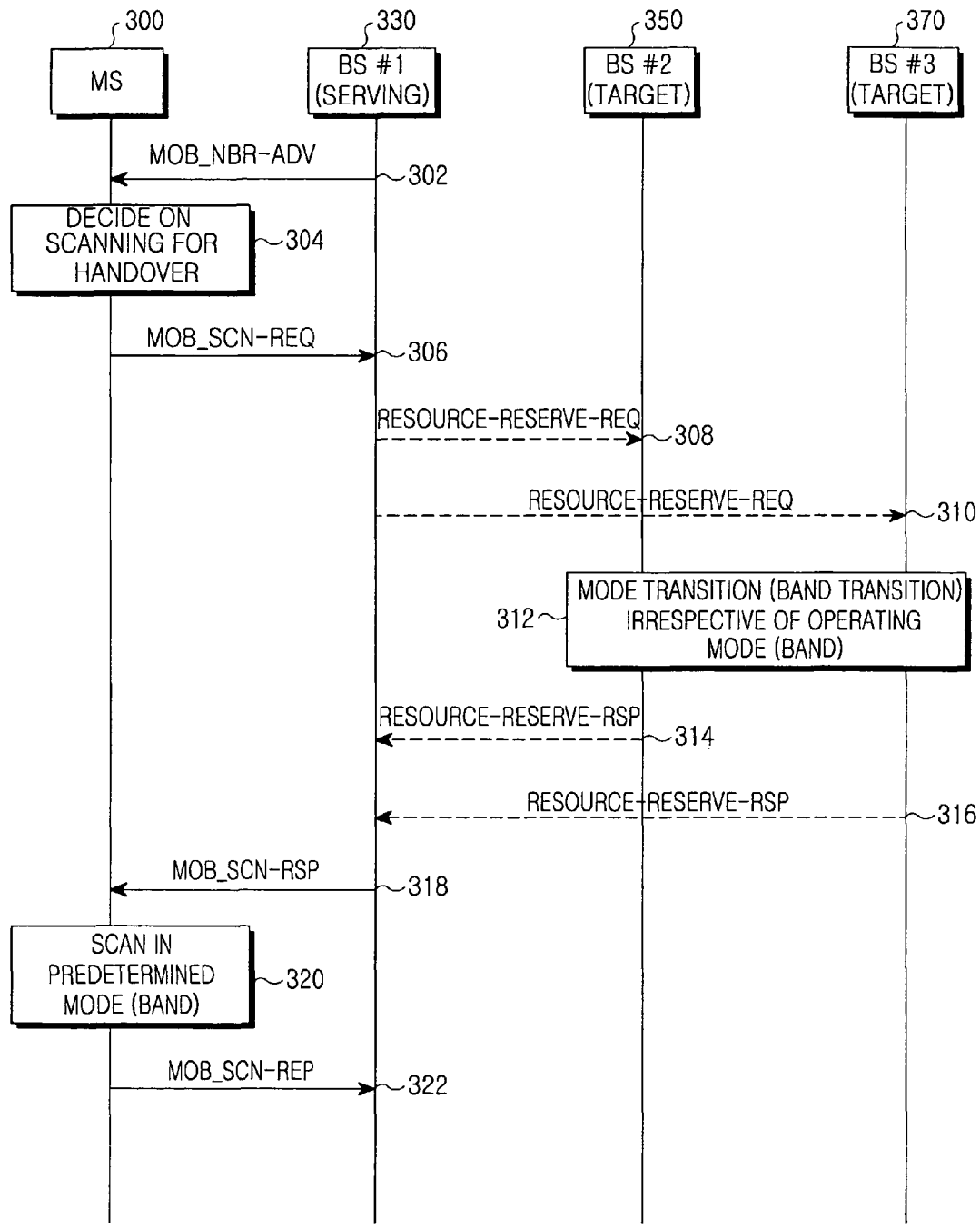
FIG. 3 is a flow diagram illustrating a signal flow for a scanning operation for an MS-initiated handover in a BWA communication system according to the present invention.

FIG. 3 is a flow diagram illustrating a signal flow for a scanning operation for an MS-initiated handover in a BWA communication system according to the present invention.

Referring to FIG. 3, BSs 330, 350 and 370 (BS #1, BS #2, and BS #3 respectively) operate in at least two different frequency bands and/or at least two frequency modes. For example, they may use an NB and a WB, and FDD mode and TDD mode. Accordingly, an MS 300 must be able to use the NB and the WB, and/or operate in the FDD mode and/or the TDD mode.

BS #1, which is a serving BS for the MS 300, transmits (i.e., sends) a MOB_NBR-ADV message to the MS 300 periodically in step 302. To configure the MOB_NBR-ADV message, a partial modification is made to the conventional MOB_NBR-ADV message, specifically to Available Radio Resource. Table 1 illustrates a comparison between the Available Radio Resource fields of the MOB_NBR-ADV message of the present invention and the conventional MOB_NBR-ADV message.

TABLE 1

| Code | Conventional (%) | Present invention (%) |
| --- | --- | --- |
| 0b0000 | 0 | TDD (or WB) 0 |
| 0b0001 | 20 | TDD (or WB) 20 |
| 0b0010 | 40 | TDD (or WB) 40 |

TABLE 1-continued

| Code | Conventional (%) | Present invention (%) |
|---|---|---|
| 0b0011 | 60 | TDD (or WB) 60 |
| 0b0100 | 80 | TDD (or WB) 80 |
| 0b0101 | 100 | TDD (or WB) 100 |
| 0b0110 | Reserved | FDD (or NB) 0 |
| 0b0111 | Reserved | FDD (or NB) 20 |
| 0b1000 | Reserved | FDD (or NB) 40 |
| 0b1001 | Reserved | FDD (or NB) 60 |
| 0b1010 | Reserved | FDD (or NB) 80 |
| 0b1011 | Reserved | FDD (or NB) 100 |
| 0b1100–0b1110 | Reserved | Reserved |
| 0b1111 | No info | No info |

Available Radio Resource is activated when the fourth bit of Skip-Optional-Fields bitmap, associated with QoS related fields is set to 0 in MOB_NBR-ADV. Hence, the serving BS 330 periodically sends the MOB_NBR-ADV message with the fourth bit of Skip-Optional-Fields bitmap set to 0 always to the MS 300. Thus the MS 300 can determine the average number of subchannels per frame and the average amount of symbol resources per frame for TDD and FDD, and the NB and WB.

After receiving the MOB_NBR-ADV message, if the signal strength of the serving BS 330 is lower than a predetermined threshold, the MS 300 decides on scanning for a handover in step 304. Thus, the MS 300 sends a MOB_SCN-REQ message to the serving BS 330 in step 306.

Upon receipt of the MOB_SCN-REQ message, the serving BS 330 sends a new RESOURCE-RESERVE-REQ message defined by the present invention to neighbor BSs, i.e., BS #2 and BS #3 in steps 308 and 310. Steps 308 and 310 may be skipped if available radio resources exist for the current operation mode (frequency band) of the MS 300 in the serving BS 330 or a neighbor BS.

If BS #2 and BS #3 have radio resources available for a particular frequency band (frequency mode) requested by the MS 300, they send RESOURCE-RESERVE-RSP messages to the serving BS 330, indicating that they have reserved the resources in steps 314 and 316. In the absence of the resources for the requested frequency band (frequency mode), BS #2 and BS #3 transition MSs using the frequency band (frequency mode) under their management to another frequency band (frequency mode), if the MSs can be transitioned. BS #2 and BS #3 reserve radio resources saved from these MSs for allocation to the MS 300 in step 312 and notify the serving BS 330 of the radio resource reservation in steps 314 and 316.

The serving BS 330 then sends a MOB_SCN-RSP message to the MS 300 in step 318.

The MS 300 scans the serving BS 330 and the neighbor BSs 350 and 370 in the frequency band (frequency mode) based on information set in the MOB_SCN-RSP message in step 320. In step 322, the MS 300 reports the scanning results to the serving BS 330 by a MOB_SCN-REP message.

Figure 4:
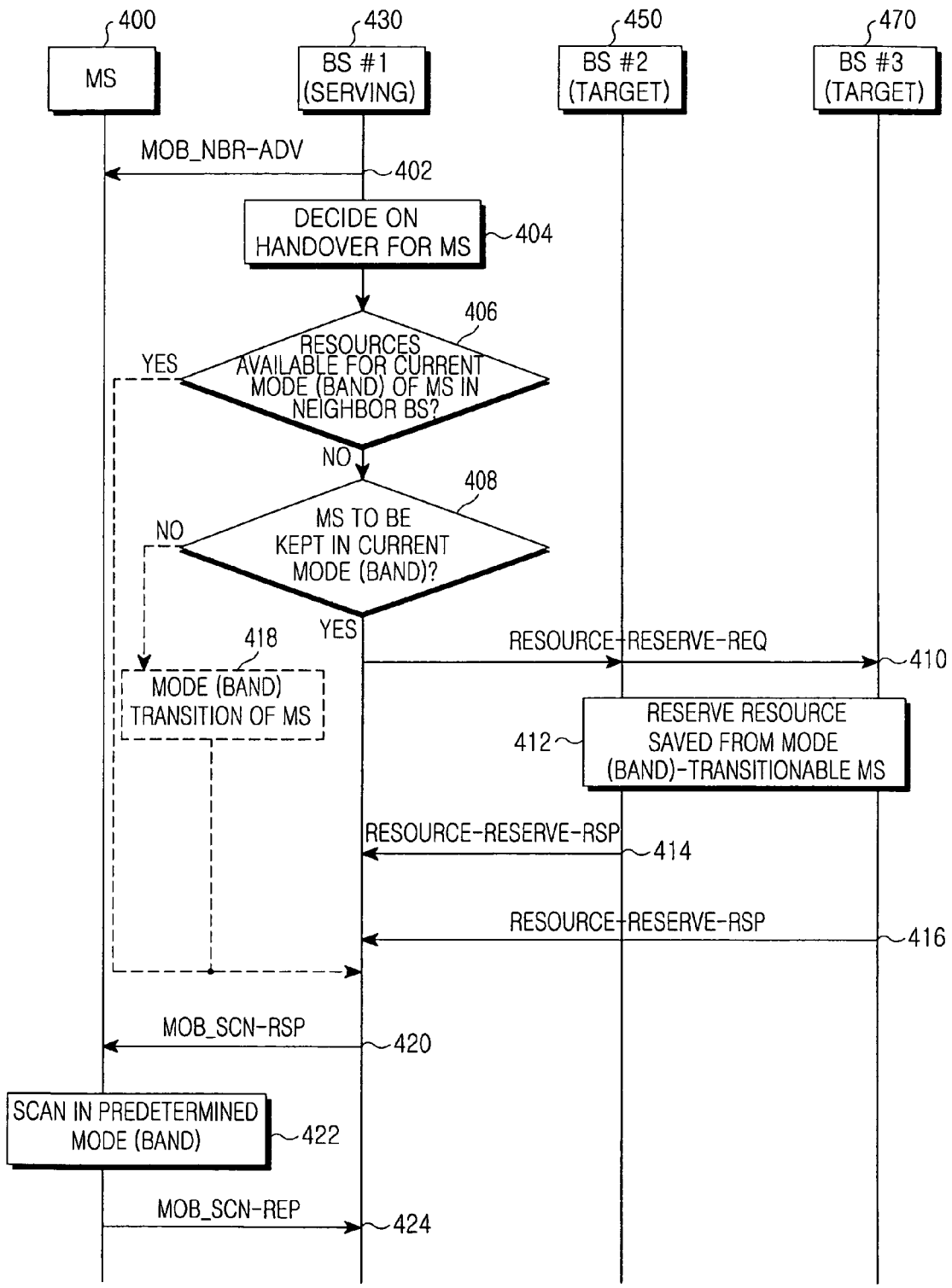
FIG. 4 is a flow chart illustrating a signal flow for a scanning operation for a BS-initiated handover in the BWA communication system according to the present invention.

FIG. 4 is a flow diagram illustrating a signal flow for a scanning operation for a BS-initiated handover in the BWA communication system according to the present invention.

Referring to FIG. 4, BSs 430, 450 and 470 (BS #1, BS #2, and BS #3, respectively) can use both the NB and WB and operate in both the FDD mode and the TDD mode, as in the illustrated case of FIG. 3. Accordingly, an MS 400 must be able to use the NB and/or the WB, and/or to operate in the FDD mode and/or the TDD mode.

BS #1, which is a serving BS for the MS 400, sends a MOB_NBR-ADV message to the MS 400 periodically in step 402. The MOB_NBR-ADV message has the fields listed in Table 1.

When BS #1 determines that handover is required for the MS 400, it decides on scanning for the handover in step 404. Thus, BS #1 determines whether the neighbor BSs 450 and 470 have resources available for the current frequency mode (frequency band) of the MS 400 based on preliminarily acquired information in step 406. If the resources are available, BS #1 sends a MOB_SCN-RSP message to the MS 400 in step 420. On the contrary, in the absence of the resources in the neighbor BSs 450 and 470, BS #1 determines whether the MS 400 must be kept in the current frequency mode (frequency band) in step 408. If mode transition (frequency band transition) is possible, BS #1 determines mode transition for the MS 400 in step 418 and sends a MOB_SCN-RSP message requesting mode transition (frequency band transition) to the MS 400 in step 420.

On the other hand, if the MS 400 must be kept in the current frequency mode (frequency band), BS #1 sends a RESOURCE-RESERVE-REQ message to the neighbor BSs, i.e. BS #2 and BS #3 in steps 410.

If BS #2 and BS #3 each have radio resources available for the MS 400, or if there is any other MSs which operates in the same frequency mode (frequency band) as that of the MS 400 and which can transition to the other frequency mode (frequency band) under the management of BS #2 and BS #3, they transition the other MSs to the other frequency mode (frequency band) and reserve radio resources saved from the other MSs for allocation to the MS 400 in step 412 and notify BS #1 of the radio resource reservation in steps 414 and 416.

BS #1 then sends a MOB_SCN-RSP message to the MS 400 in step 420. Upon receipt of the MOB_SCN-RSP message, the MS 400 scans BS #1, BS #2, and BS #3 in the frequency mode (frequency band) in step 422 and reports the scanning results to BS #1 by a MOB_SCN-REP message in step 424. In this way, the MS 400 can hand over to one of the neighbor BSs 450 and 470 which has reserved the resources for the MS 400.

Figure 5:
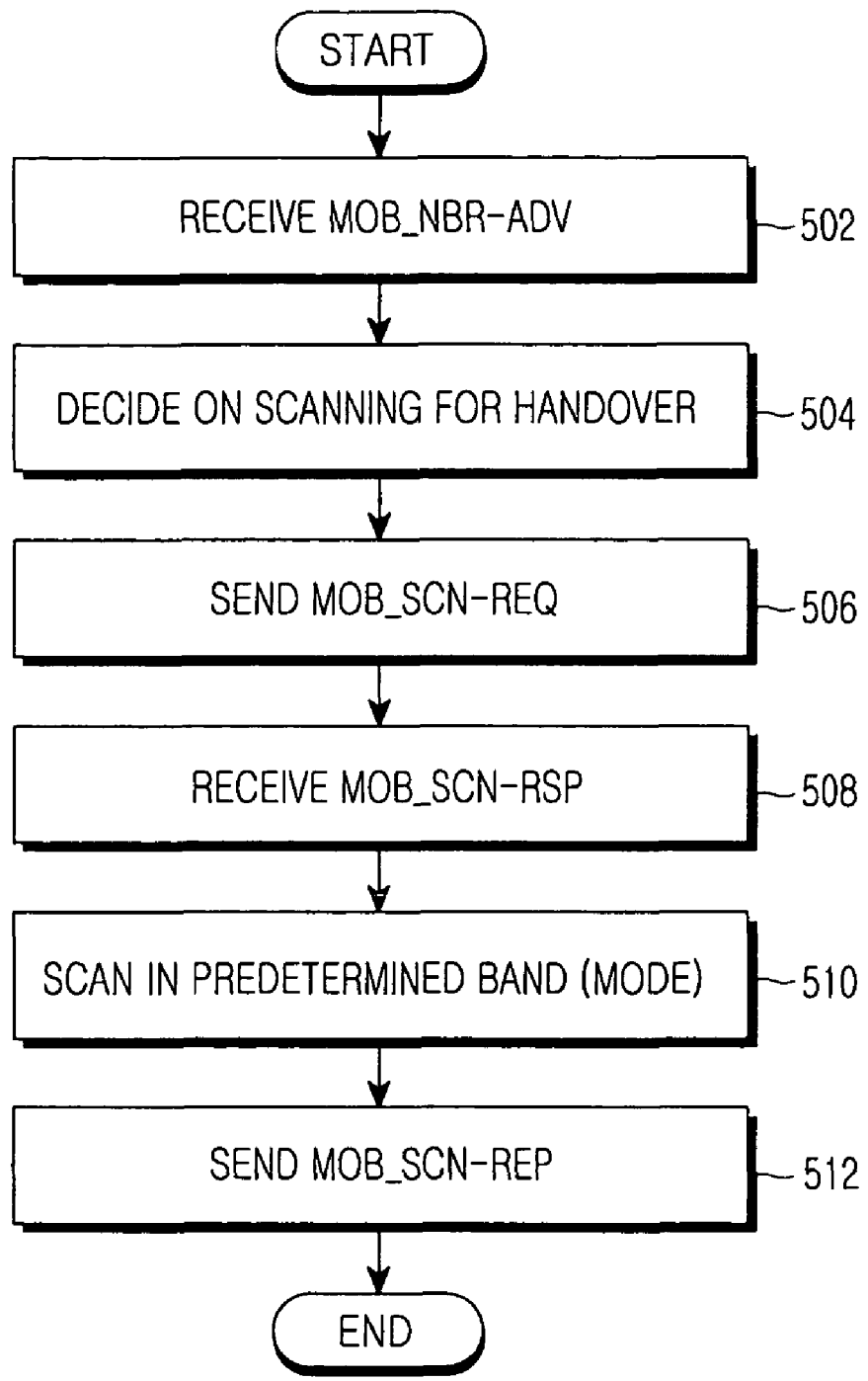
FIG. 5 is a flowchart illustrating a scanning operation in an MS in the BWA communication system according to the present invention.

FIG. 5 is a flowchart illustrating a scanning operation in the MS in the BWA communication system according to the present invention.

Referring to FIG. 5, the MS receives a MOB_NBR-ADV message broadcast periodically from the serving BS in step 502. The MOB_NBR-ADV message has the fourth bit of Skip-Optional-Fields bitmap set to 0 and Available Radio Resource configured as illustrated in Table 1. In step 504, the MS decides on scanning for handover, if the signal strength of the serving BS is equal to or less than a predetermined threshold. The MS sends a MOB_SCN-REQ message for the handover to the serving BS in step 506.

Upon receipt of a MOB_SCN-RSP message from the serving BS in step 508, the MS scans the neighbor BSs in the current frequency band (frequency mode) irrespective of whether frequency mode transition (frequency band transition) has been performed for the MS in step 510. The neighbor BSs to be scanned are indicated by the last received MOB_NBR-ADV message. In step 512, the MS sends a MOB_SCN-REP message containing the scanning results to the serving BS.

Figure 6:
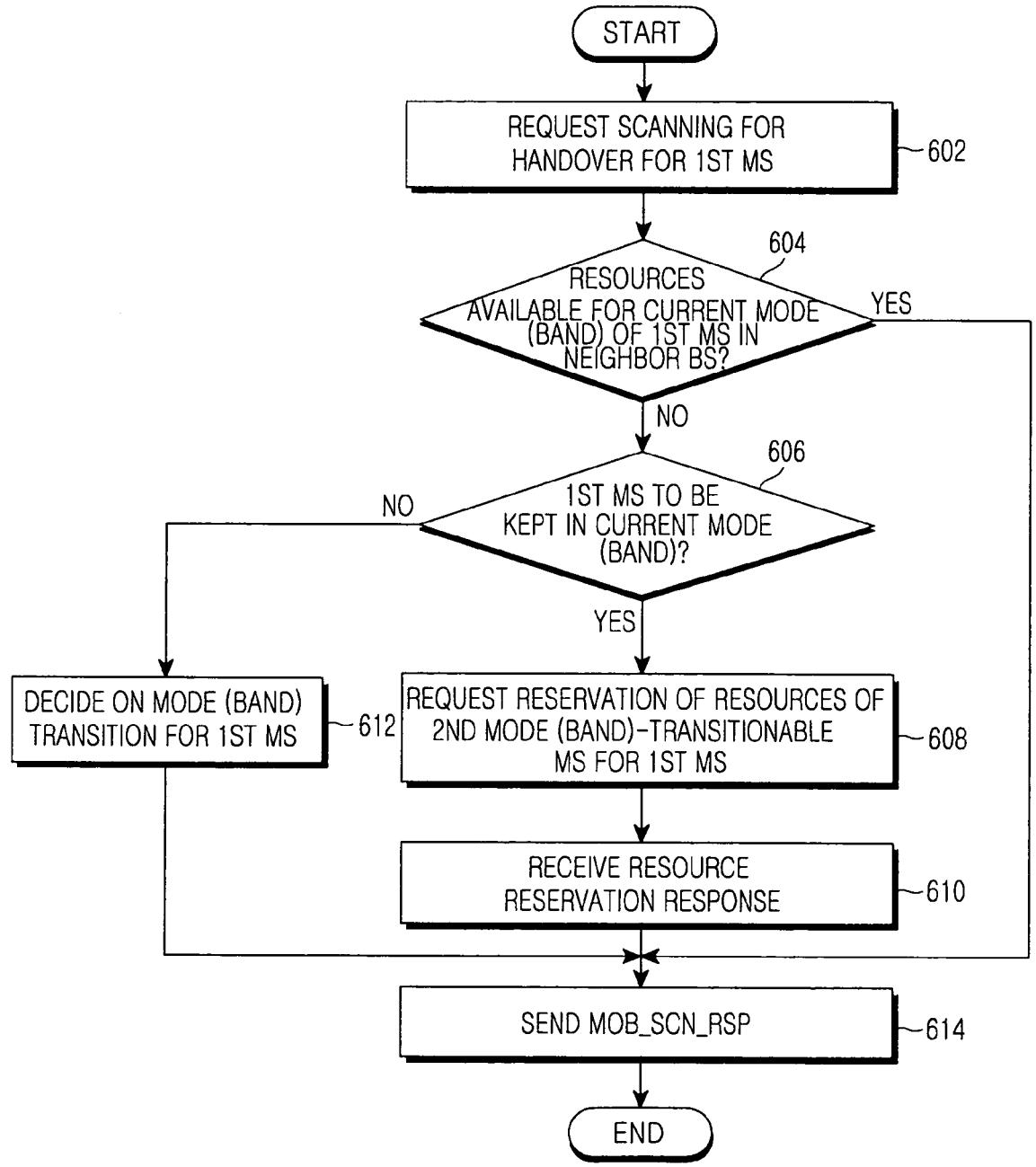
FIG. 6 is a flowchart illustrating a scanning operation in a serving BS in the BWA communication system according to the present invention.

FIG. 6 is a flowchart illustrating a scanning operation in the serving BS in the BWA communication system according to the present invention.

Referring to FIG. 6, the serving BS decides on scanning for handover of the MS for the reason of load distribution, for example, in step 602 and determines whether radio resources are available for the current frequency mode (frequency band) of the MS in any neighbor BS in step 604. In the presence of the radio resources in the neighbor BS, the serving BS sends a MOB_SCN-RSP message to the MS in step 614.

In the absence of the radio resources in the neighbor BS, the serving BS determines whether the MS must be kept in the current frequency mode (frequency band) in step 606. If frequency mode (frequency band) transition is possible for the MS, the serving BS decides on the frequency mode transition (frequency band) transition for the MS in step 612 and sends a MOB_SCN-RSP message requesting scanning in a transitioned frequency mode (frequency band) to the MS in step 614.

However, if the MS can operate in the current frequency mode (frequency band) only, the serving BS requests the neighbor BS to save resources from an MS that can transition to the other frequency mode (frequency band) under its management and reserve the saved resources for the handover MS by a RESOURCE-RESERVE-REQ message in step 608. That is, the neighbor BS performs frequency mode transition (frequency band transition) for an MS which can transition from the frequency mode (frequency band) of the handover MS to the other frequency mode (frequency band) among MSs operating in the same frequency mode (frequency band) as that of the handover MS under management of the neighbor BS, and reserves resources saved from the MS for the handover MS.

In step 610, the serving BS receives a RESOURCE-RESERVE-RSP message from the neighbor BS. If the RESOURCE-RESERVE-RSP message indicates failed resource reservation due to the absence of any MS that can transition to the other frequency mode (frequency band), the serving BS can send a RESOURCE-RESERVE-REQ message to neighbor BSs other than the neighbor BS. If all neighbor BSs fail to reserve radio resources for the handover MS, the serving BS drops the call for the handover MS or requests a general scanning other than the handover scanning to the handover MS.

Figure 7:
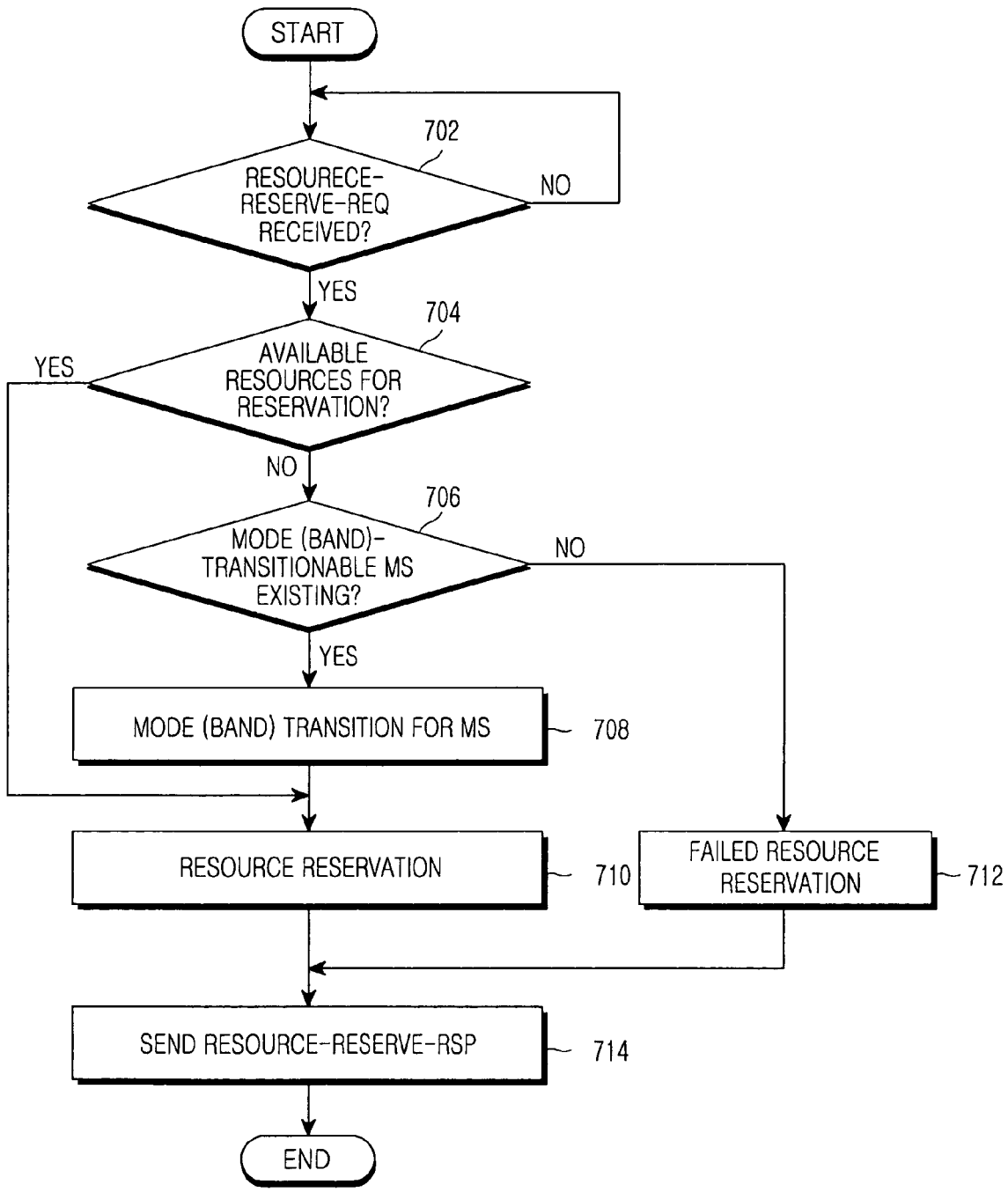
FIG. 7 is a flowchart illustrating a scanning operation in a neighbor BS in the BWA communication system according to the present invention.

FIG. 7 is a flowchart illustrating a scanning operation in the neighbor BS in the BWA communication system according to the present invention.

Referring to FIG. 7, the neighbor BS receives a RESOURCE-RESERVE-REQUEST message from the serving BS in step 702 and determines the presence (or absence of) radio resources available for the handover MS in step 704. In the presence of the radio resources, the neighbor BS proceeds to step 710 and in the absence of the radio resources, the neighbor BS proceeds to step 706.

In step 706, the neighbor BS determines whether there is any MS for which frequency mode transition (frequency band transition) is possible. In the presence of an MS that can mode-transition (frequency band transition), the neighbor BS goes to step 708 and in the absence of any MS to be mode-transitioned (frequency band-transitioned), the neighbor BS goes to step 712. The neighbor BS performs frequency mode transition (frequency band transition) for the MS in step 708, reserves radio resources saved from the mode (band)-transitions MS for the handover MS in step 710, and proceeds to step 714. Meanwhile, the neighbor BS determines that radio resources cannot be reserved for the handover MS due to the absence of any MS for which mode transition (frequency band transition) is possible in step 712, and goes to step 714.

In step 714, the neighbor BS sends to the serving BS a RESOURCE-RESERVE-RSP message indicating successful resource reservation or failed resource reservation for the handover MS.

In accordance with the present invention as described above, in a communication system where a BS operates in at least two frequency bands having different central frequencies and/or at least two different frequency modes, an MS scans only in one frequency band and/or frequency mode, thereby preventing a data reception delay and data reception errors involved in the scanning. In addition, since a neighbor BS reserves radio resources beforehand for the frequency band (frequency mode) of the MS, handover is implemented successfully.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of performing a Mobile Station (MS)-initiated scanning in an MS in a wireless mobile communication system having at least two frequency bands with different central frequencies, comprising:
    receiving from a serving Base Station (BS) a mobile neighbor advertisement message including information about available radio resources for each of the at least two frequency bands in each of the serving BS and neighbor BSs;
    determining whether to measure Carrier to Interference and Noise Ratios (CINRs) of pilot signals received from the serving BS and the neighbor BSs;
    transmitting a new scanning request message to the serving BS when the MS determines to measure the CINRs of the pilot signals;
    receiving a scanning response message including information about a predetermined frequency band corresponding to the available radio resources from the serving BS; and
    measuring the CINRs of the pilot signals received from the serving BS and the neighbor BSs in the predetermined frequency band,
    wherein, in the at least two frequency bands, a width of a first frequency band is narrower than a width of a second frequency band.

2. The method of claim 1, wherein the information about the available radio resources includes information indicating an average number of subchannels and an average amount of symbol resources available for each of the at least two frequency bands in each of the serving BS and the neighbor BSs.

3. The method of claim 1, wherein the MS determines to measure the CINRs of the pilot signals from the serving BS and the neighbor BSs when a CINR of a current channel is lower than a predetermined threshold.

4. A scanning method in a serving Base Station (BS) in a wireless mobile communication system having at least two frequency bands with different central frequencies, comprising:
    transmitting a mobile neighbor advertisement message including information about available radio resources for each of the at least two frequency bands in each of the serving BS and neighbor BSs;
    determining whether radio resources are available for a current frequency band of a Mobile Station (MS) in the neighbor BSs, if determining that scanning is required for the MS;
    requesting the neighbor BSs to reserve radio resources for the current frequency band of the MS, in the absence of the available radio resources;
    receiving a response message corresponding to the resource reservation request from the neighbor BSs; and
    transmitting a scanning response message including information about a predetermined frequency band corresponding to the available radio resources to the MS, if the response message indicates a successful resource reservation, wherein, in the at least two frequency bands a width of a first frequency band is narrower than a width of a second frequency band.

5. The scanning method of claim 4, wherein the information about the available radio resources includes information indicating an average number of subchannels and an average amount of symbol resources available for each of the at least two frequency bands in each of the serving BS and the neighbor BSs.

6. The scanning method of claim 4, further comprising if the response message indicates a failed resource reservation, transmitting a scanning response message requesting scanning after frequency band transition of the MS, if the MS can transition to another frequency band.

7. The scanning method of claim 4, further comprising transmitting a scanning request message including information about a BS which has the available radio resources to the MS, in the presence of the available radio resources.

8. The scanning method of claim 4, wherein the scanning response message is a response message corresponding to a scanning request transmitted by the MS.

9. The scanning method of claim 4, wherein the scanning response message is an unsolicited response message transmitted to the MS.

10. A scanning method in a Base Station (BS) neighboring to a serving BS in a wireless mobile communication system having at least two frequency bands with different central frequencies, comprising the steps of:

receiving a resource reservation request for a first Mobile Station (MS) from the serving BS;

determining whether available radio resources exist for a first frequency band in which the first MS currently operates;

searching for a second MS operating in a frequency band that corresponds with the first frequency band of the first MS and is capable of transitioning to a second frequency band among MSs managed by the neighbor BS, in the absence of the available radio resources;

releasing radio resources used in the first frequency band for the second MS by transitioning the second MS to the second frequency band, if the second MS is searched;

reserving the released radio resources for the first MS; and transmitting information indicating the radio resource reservation to the serving BS, wherein, in the at least two frequency bands, a width of a first frequency band is narrower than a width of a second frequency band.

11. The scanning method of claim 10, further comprising transmitting information indicating a failed resource reservation to the serving BS, if the second MS is not searched.

12. A scanning system in a wireless mobile communication system having at least two frequency bands with different central frequencies, comprising:

a Mobile Station (MS);

a serving Base Station (BS); and a neighbor BS, wherein the MS receives from the serving BS a mobile neighbor advertisement message including information about available radio resources for each of the at least two frequency bands in each of the serving BS and the neighbor BS, determines whether to measure Carrier to Interference and Noise Ratios (CINRs) of pilot signals received from the serving BS and the neighbor BS, transmits a new scanning request message to the serving BS when the MS determines to measure the CINRs of the pilot signals, receives a scanning response message including information about a predetermined frequency band corresponding to the available radio resources from the serving BS and measures the CINRs of the pilot signals received from the serving BS and the neighbor BS in the predetermined frequency band, the serving BS transmits the mobile neighbor advertisement message, determines whether radio resources are available for a first frequency band in which the MS currently operates in the serving BS and the neighbor BS, upon receipt of a scanning request message from the MS or if it determines that scanning is required for the MS, requests the neighbor BS to reserve radio resources for the first frequency band, in the absence of the available radio resources, receives, from the neighbor BS, a response message corresponding to a resource reservation request, and transmits the scanning response message including the predetermined frequency band corresponding to the available radio resources to the MS, if the response message indicates successful resource reservation; and the neighbor BS receives the resource reservation request from the serving BS, determines whether available radio resources exist for the first frequency band, searches for a second MS operating in the first frequency band of the first MS and capable of transitioning to a second frequency band among MSs managed by the neighbor BS, in the absence of the available radio resources, releases radio resources used in the first frequency band for the second MS by transitioning the second MS to the second frequency band, if the second MS is searched reserves the released radio resources for the MS, and transmits the response message indicating successful radio resource reservation to the serving BS, wherein, in the at least two frequency bands, a width of a first frequency band is narrower than a width of a second frequency band.

13. The scanning system of claim 12, wherein the available radio resources information includes information indicating an average number of subchannels and an average amount of symbol resources available for each of the at least two frequency bands in each of the serving BS and the neighbor BSs.

14. The scanning system of claim 12, wherein if the response message indicates a failed resource reservation, the serving BS transmits a scanning response message requesting scanning after frequency band transition of the MS, if the MS can transition to another frequency band.

15. The scanning system of claim 12, wherein in the presence of the available radio resources, the serving BS transmits a scanning request message including information about a BS which has the available radio resources to the MS.

16. The scanning system of claim 12, wherein the scanning response message is a response message corresponding to the scanning request message transmitted by the MS.

17. The scanning system of claim 12, wherein the scanning response message is an unsolicited response message transmitted to the MS.

18. The scanning system of claim 12, wherein the neighbor BS transmits information indicating a failed resource reservation to the serving BS, if the second MS is not searched.

19. A method of performing a Mobile Station (MS)-initiated scanning in an MS in a wireless mobile communication system having at least two different frequency modes, comprising the steps of:

receiving from a serving Base Station (BS) a mobile neighbor advertisement message including information about available radio resources for each of the at least two different frequency modes in each of the serving BS and neighbor BSs;

determining whether to measure Carrier to Interference and Noise Ratios (CINRs) of pilot signals received from the serving BS and the neighbor BSs;

transmitting a scanning request message to the serving BS when the MS determines to measure the CINRs of the pilot signals;

receiving a scanning response message including information about a predetermined frequency mode corresponding to the available radio resources from the serving BS; and measuring the CINRs of the pilot signals received from the serving BS and the neighbor BS in the predetermined frequency mode, wherein the at least two different frequency modes include a Time Division Duplexing (TDD) mode and a Frequency Division Duplexing (FDD).

20. The method of claim 19, wherein the available radio resources information includes information indicating an average number of subchannels and an average amount of symbol resources available for each of the at least two frequency modes in each of the serving BS and the neighbor BSs.

21. The method of claim 19, wherein the determining step comprises determining whether to measure the CINRs of the pilot signals from the serving BS and the neighbor BSs when a CINR of a current channel is lower than a predetermined threshold.

22. A scanning method in a serving Base Station (BS) in a wireless mobile communication system having at least two different frequency modes, comprising:

transmitting a mobile neighbor advertisement message including information about available radio resources for each of the at least two different frequency modes in each of the serving BS and neighbor BSs;

determining whether radio resources are available for a current frequency mode of a Mobile Station (MS) in the serving BS and the neighbor BSs, if determining that scanning is required for the MS;

requesting the neighbor BSs to reserve radio resources for the current frequency mode of the MS, in the absence of the available radio resources;

receiving a response message for the resource reservation request from the neighbor BSs; and transmitting a scanning response message including information about a predetermined frequency mode corresponding to the available radio resources to the MS, if the response message indicates a successful resource reservation, wherein the at least two different modes include a Time Division Duplexing (TDD) mode and a Frequency Division Duplexing (FDD).

23. The scanning method of claim 22, wherein the information about the available radio resources includes information indicating an average number of subchannels and an average amount of symbol resources available for each of the at least two different frequency modes in each of the serving BS and the neighbor BSs.

24. The scanning method of claim 22, further comprising, if the response message indicates a failed resource reservation, transmitting a scanning response message requesting scanning after frequency mode transition of the MS, if the MS can transition to another frequency mode.

25. The scanning method of claim 22, further comprising transmitting a scanning request message including information about a BS which has the available radio resources to the MS, in the presence of the available radio resources.

26. The scanning method of claim 22, wherein the scanning response message is an unsolicited response message transmitted to the MS.

27. A scanning method in a Base Station (BS) neighboring a serving BS in a wireless mobile communication system having at least two different frequency modes, comprising:

receiving a resource reservation request for a first Mobile Station (MS) from the serving BS;

determining whether available radio resources exist for a first frequency mode in which the first MS currently operates;

searching for a second MS operating in the first frequency mode and capable of transitioning to a second frequency mode among MSs managed by the neighbor BS, in the absence of the available radio resources;

releasing radio resources used in the first frequency mode for the second BS by transitioning the second MS to the second frequency mode, if the second MS is searched;

reserving the released radio resources for the first MS; and transmitting information indicating the radio resource reservation to the serving BS, wherein the at least two different modes include a Time Division Duplexing (TDD) mode and a Frequency Division Duplexing (FDD).

28. The scanning method of claim 27, further comprising transmitting information indicating a failed resource reservation to the serving BS, if the second MS is not searched.

29. A scanning system in a wireless mobile communication system having at least two different frequency modes, comprising:

a Mobile Station (MS);

a serving Base Station (BS); and a neighbor BS, wherein the MS receives from the serving BS a mobile neighbor advertisement message including information about available radio resources for each of the at least two frequency bands in each of the serving BS and the neighbor BSs, determines whether to measure Carrier to Interference and Noise Ratios (CINRs) of pilot signals received from the serving BS and the neighbor BSs, transmits a scanning request message to the serving BS, when the MS determines to measure the CINRs of the pilot signals, receives a scanning response message including information about a predetermined frequency mode corresponding to the available radio resources from the serving BS, and measures the CINRs of the pilot signals received from the serving BS and the neighbor BSs in the predetermined frequency mode, the serving BS transmits the mobile neighbor advertisement message, determines whether radio resources are available for a first frequency mode in which the MS currently operates in the serving BS and the neighbor BS, upon receipt of a scanning request from the MS or if determining that scanning is required for the MS, requests the neighbor BS to reserve radio resources for the first frequency mode, in the absence of the available radio resources, receives a response message corresponding to a resource reservation request from the neighbor BS, and transmits the scanning response message including the predetermined frequency band corresponding to the available radio resources to the MS, if the response message indicates a successful resource reservation; and the neighbor BS receives the resource reservation request from the serving BS, determines whether available radio resources exist for the first frequency mode, searches for a second MS operating in the first frequency mode of the first MS and capable of transitioning to a second frequency mode among MSs managed by the neighbor BS, in the absence of the available radio resources, releases radio resources used in the first frequency mode for the second MS by transitioning the second MS to the second frequency mode, if the second MS is searched, reserves the released radio resources for the MS, and transmits the response message indicating successful radio resource reservation to the serving BS, wherein the at least two different modes include a Time Division Duplexing (TDD) mode and a Frequency Division Duplexing (FDD).

30. The scanning system of claim 29, wherein the information about the available radio resources includes information indicating an average number of subchannels and an average amount of symbol resources available for each of the at least two frequency modes in each of the serving BS and the neighbor BS.

31. The scanning system of claim 29, wherein if the response message indicates a failed resource reservation, the serving BS transmits a scanning response message requesting scanning after frequency mode transition of the MS, if the MS can transition to another frequency mode.

32. The scanning system of claim 29, wherein in the presence of the available radio resources, the serving BS transmits a scanning request message including information about a BS which has the available radio resources to the MS.

33. The scanning system of claim 29, wherein the scanning response message is an unsolicited response message transmitted to the MS.

34. The scanning system of claim 29, wherein the neighbor BS transmits information indicating a failed resource reservation to the serving BS, if the second MS is not searched.

* * * * *